United States Patent [19]
Tani et al.

[11] Patent Number: 5,475,290
[45] Date of Patent: Dec. 12, 1995

[54] DEVICE FOR PROTECTING WASHING MACHINE MOTOR INCLUDING BRUSHLESS MOTOR AGAINST OVERCURRENT

[75] Inventors: Kazutoshi Tani, Tokyo; Fumihiro Imamura, Seto, both of Japan

[73] Assignee: Kabushiki Kaisha Toshiba, Kawasaki, Japan

[21] Appl. No.: 252,776

[22] Filed: Jun. 2, 1994

Related U.S. Application Data

[62] Division of Ser. No. 227,194, Apr. 13, 1994, abandoned, which is a continuation of Ser. No. 99,877, Apr. 19, 1993, abandoned, which is a continuation of Ser. No. 750,651, Aug. 27, 1991.

[30] Foreign Application Priority Data

Aug. 28, 1990 [JP] Japan ................................. 2-226914

[51] Int. Cl.$^6$ ..................................................... H02P 3/00
[52] U.S. Cl. ...................................... 318/434; 361/31
[58] Field of Search ..................... 318/434, 138, 318/799–812, 254, 439; 361/23, 31, 25

[56] References Cited

U.S. PATENT DOCUMENTS

| | | | |
|---|---|---|---|
| 4,060,753 | 11/1977 | Okuyama et al. | 318/254 X |
| 4,286,303 | 8/1981 | Genheimer et al. | 361/24 |
| 4,295,085 | 10/1981 | Lafuze | 318/138 X |
| 4,511,830 | 4/1985 | Yamada et al. | 318/464 |
| 4,651,067 | 3/1987 | Ito et al. | 318/254 |
| 4,710,683 | 12/1987 | Bahn et al. | 312/254 |
| 4,722,018 | 1/1988 | Pohl | 361/33 X |
| 4,845,594 | 7/1989 | Wilherson | 361/71 |
| 4,901,121 | 2/1990 | Miyanaga et al. | 361/33 |
| 4,939,909 | 7/1990 | Tsuchiyama et al. | 62/158 |
| 5,001,406 | 3/1991 | Peterson | 318/254 |
| 5,057,962 | 10/1991 | Alley et al. | 361/24 |
| 5,327,064 | 7/1994 | Arakawa et al. | 318/801 |

*Primary Examiner*—Jonathan Wysocki
*Attorney, Agent, or Firm*—Limbach & Limbach

[57] ABSTRACT

A washing machine includes a brushless motor, a position sensing element for sensing a rotational position of a rotor of the motor, a motor drive control circuit composed of an inverter main circuit for driving the motor and an inverter control circuit for controlling the inverter main circuit based on a signal generated by the position sensing element, a current detector for detecting a current flowing in the inverter main circuit, an overcurrent determining circuit generating an overcurrent detection signal when the current detected by the current detector exceeds a reference value, and an abnormal condition detector for generating an abnormal condition detection signal when the number of times of output of the overcurrent detection signal generated by the overcurrent determining circuit reaches a predetermined value.

2 Claims, 4 Drawing Sheets

DEVICE FOR PROTECTING WASHING MACHINE MOTOR INCLUDING BRUSHLESS MOTOR AGAINST OVERCURRENT

This is a divisional patent application of prior application Ser. No. 08/227,194 filed Apr. 13, 1994, now abandoned, which was a continuation of prior application Ser. No. 08/099,877 filed Apr. 19, 1993, now abandoned, which was a continuation of prior application Ser. No. 07/750,651 filed Aug. 27, 1991.

BACKGROUND OF THE INVENTION

This invention relates to a washing machine incorporating a brushless motor serving as a washing machine motor for driving both a dehydration tub and an agitator.

An agitator is driven by a washing machine motor for either a wash or a rinse operation and a dehydration tub is rotated at a high speed by the washing machine motor for a dehydration operation, as well known in the art. Induction motors have been employed as such a washing machine motor as described above.

Recently, small-sized, light-weight and yet, high-level cleaning performance washing machines have been demanded. To meet this demand, an output torque of the washing machine motor needs to be increased. However, an output power of the induction motor conventionally employed as the washing machine motor is at a relatively low level. Accordingly, in order to obtain a desired output torque from the induction motor, a rating power of the induction motor needs to be increased. However, the increase in the rating power increases the size of the induction motor, which further increases the size of the washing machine. In view of this disadvantage, it has been proposed to employ a brushless motor as the washing machine motor for the induction motor. A brushless motor running system generally comprises a position sensing element for sensing a rotational position of a rotor of the brushless motor and a motor drive control circuit including an inverter main circuit for driving the motor and an inverter control circuit for controlling the inverter main circuit based on a signal generated by the position sensing element so that the motor is driven at a desired rotational speed and a feedback control is performed to obtain a constant speed.

The above-mentioned inverter main circuit includes transistors serving as semiconductor switching elements. These transistors are deteriorated to cause malfunction when an overcurrent due to a heavy load flows into the inverter main circuit. To solve this problem, it has been proposed to detect the overcurrent by detecting the inverter main circuit current. However, in the washing machines, an instantaneous overcurrent flows when the load applied to the motor temporarily varies because of movement of the clothes in the tub. Such an instantaneous overcurrent has little influence upon the transistors. Thus, the instantaneous overcurrent due to the movement of the clothes in the tub can be mistakenly determined to be an overcurrent due to a continuous heavy load causing malfunction of the transistors.

Furthermore, the above-mentioned position sensing element is to be disposed inside the washing machine motor placed at the lower portion of the washing machine while the inverter control circuit is to be arranged at the upper portion or the rear of the washing machine. A long signal line will be necessary between the position sensing element and the inverter control circuit. Noise will be likely to invade the long signal line and consequently, the signal transmission from the position sensing element to the inverter control circuit will become unreliable.

SUMMARY OF THE INVENTION

Therefore, a primary object of the present invention is to provide a washing machine wherein the washing machine motor and accordingly, the washing machine itself can be rendered small-sized and the inverter main circuit can be protected without the instantaneous overcurrent due to movement of the clothes in the tub being mistakenly determined to be a heavy overcurrent causing malfunction of the inverter main circuit.

Another object of the invention is to provide a washing machine wherein the signal transmission from the position sensing element to the inverter control circuit can be reliably performed without any influence of noise.

In one aspect of the present invention, a device for protecting a washing machine motor including a brushless motor against an overcurrent comprises a position sensing element for sensing a rotational position of a rotor of the washing machine motor, a motor drive control circuit comprising an inverter main circuit for driving the washing machine motor and an inverter control circuit for controlling the inverter main circuit based on a signal generated by the position sensing element, current detecting means for detecting a current flowing in the inverter main circuit, an overcurrent detector generating an overcurrent detection signal when the current detected by the current detecting means exceeds a reference value, and abnormal condition detecting means for generating an abnormal condition detection signal when the number of times of output of the overcurrent detection signal generated by the overcurrent determining means reaches a predetermined value.

In accordance with the above-described overcurrent protecting device, the washing machine motor and accordingly, the washing machine itself can be rendered small-sized since the brushless motor is employed as the washing machine motor. Furthermore, the abnormal condition detecting means is provided for generating an abnormal condition detection signal when the number of times of output of the overcurrent detection signals reaches the predetermined value. Consequently, the instantaneous overcurrent due to the movement of the clothes in the tub is not determined to be the abnormal condition and only the overcurrent due to the heavy load causing the malfunction of the inverter main circuit is determined to be an abnormal condition.

It is preferable that temporary interruption signal generating means be provided for generating a temporary interruption signal for temporarily interrupting the inverter main circuit for a predetermined short period of time at every time of generation of the overcurrent detection signal before the number of times of output of the overcurrent detection signal reaches the predetermined value. Consequently, the switching element of the inverter main circuit can be protected against an excessively large current.

It is preferable that the current detecting means comprise a reference voltage generating circuit, a comparing circuit comparing a detected voltage with a reference voltage generated by the reference voltage generating circuit, the comparing circuit generating an overcurrent detection signal when the voltage detected by the current detecting means exceeds the reference voltage generated by the reference voltage generating circuit and a latch circuit latching the overcurrent detection signal generated by the comparing circuit. It is also preferable that the abnormal condition detecting means count the overcurrent detection signals when supplied with them and resets the latch circuit, the abnormal condition detecting means generating an abnormal condition detection signal when counting sixteen overcurrent detection signals or more per minute.

In another aspect of the invention, a device for detecting rotational position of a washing machine motor including a brushless motor comprises a position sensing element for sensing a rotational position of a rotor of the washing machine motor, a motor drive control circuit comprising an inverter main circuit for driving the washing machine motor and an inverter control circuit for controlling the inverter main circuit based on a signal generated by the position sensing element, and signal voltage raising means disposed closer to the inverter control circuit than to the position sensing element, the signal voltage raising means comprising a signal level converter arranged across a signal line through which the signal generated by the position sensing element is delivered to the inverter control circuit, a first direct current power supply circuit supplying a direct current voltage to an input side of the signal level converter in the signal line, and a second direct current power supply circuit supplying a direct current voltage to an output side of the signal level converter in the signal line, the first direct current power supply circuit generating an output voltage higher than an output voltage generated by the second direct current power supply circuit.

Since the signal voltage raising means is provided for raising the voltage level of the output signal generated by the position sensing element, the signal voltage level at the signal line can be raised, which increases a signal-to-noise (S/N) ratio. Consequently, the signal transmission from the position sensing element to the inverter control circuit can be performed without any influence of noise even when the noise invades the signal line.

Other objects of the present invention will become obvious upon understanding of the illustrative embodiments about to be described or will be indicated in the appended claims. Various advantages not referred to herein will occur to one skilled in the art upon employment of the invention in practice.

BRIEF DESCRIPTION OF THE DRAWINGS

The invention will be described merely by way of example with reference to the accompanying drawings in which.

DESCRIPTION OF THE PREFERRED EMBODIMENTS

Figure 1:
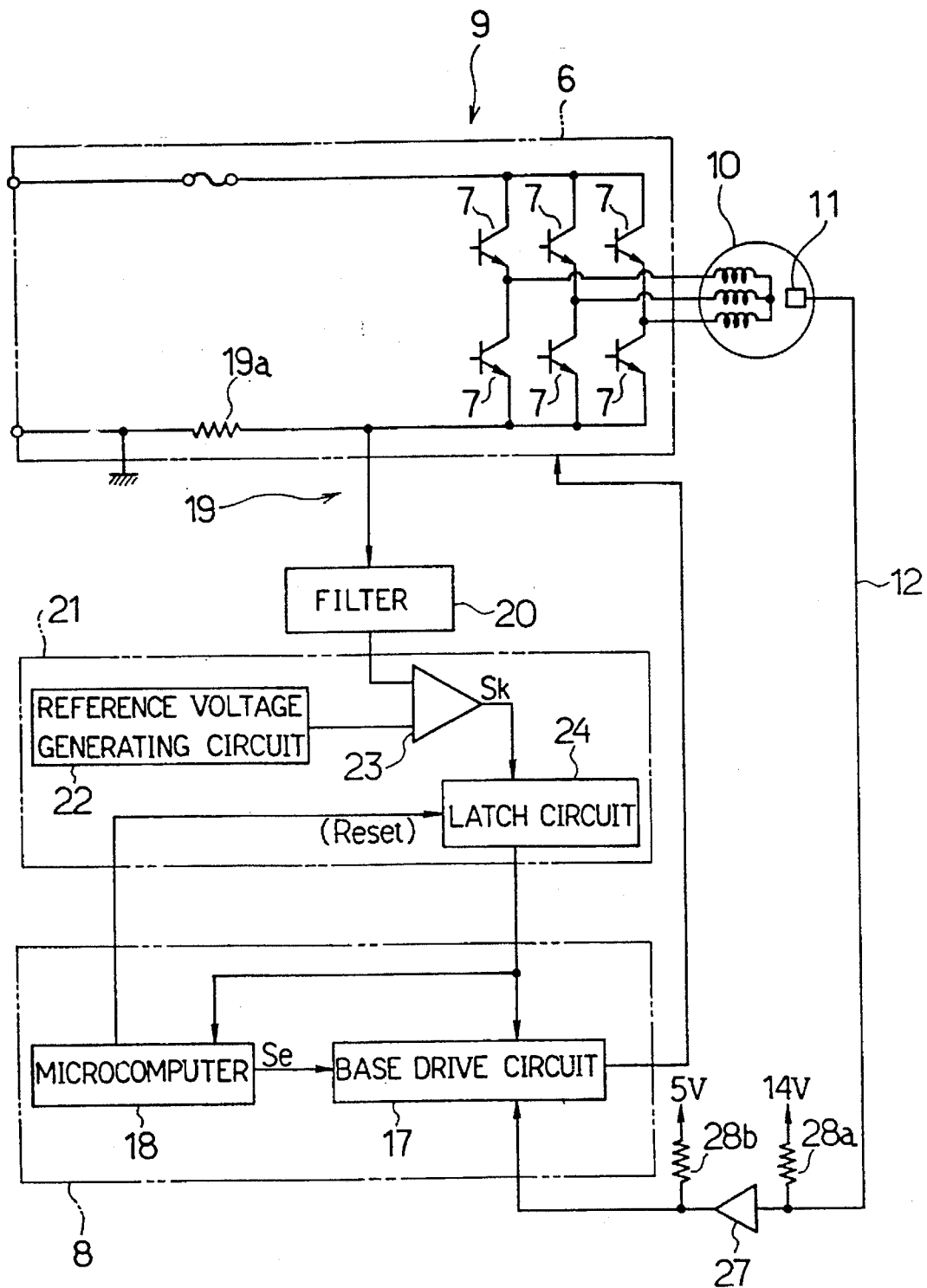
FIG. 1 is an electrical circuit diagram showing a motor drive control circuit employed in the washing machine in accordance with one embodiment of the present invention.
Figure 2:
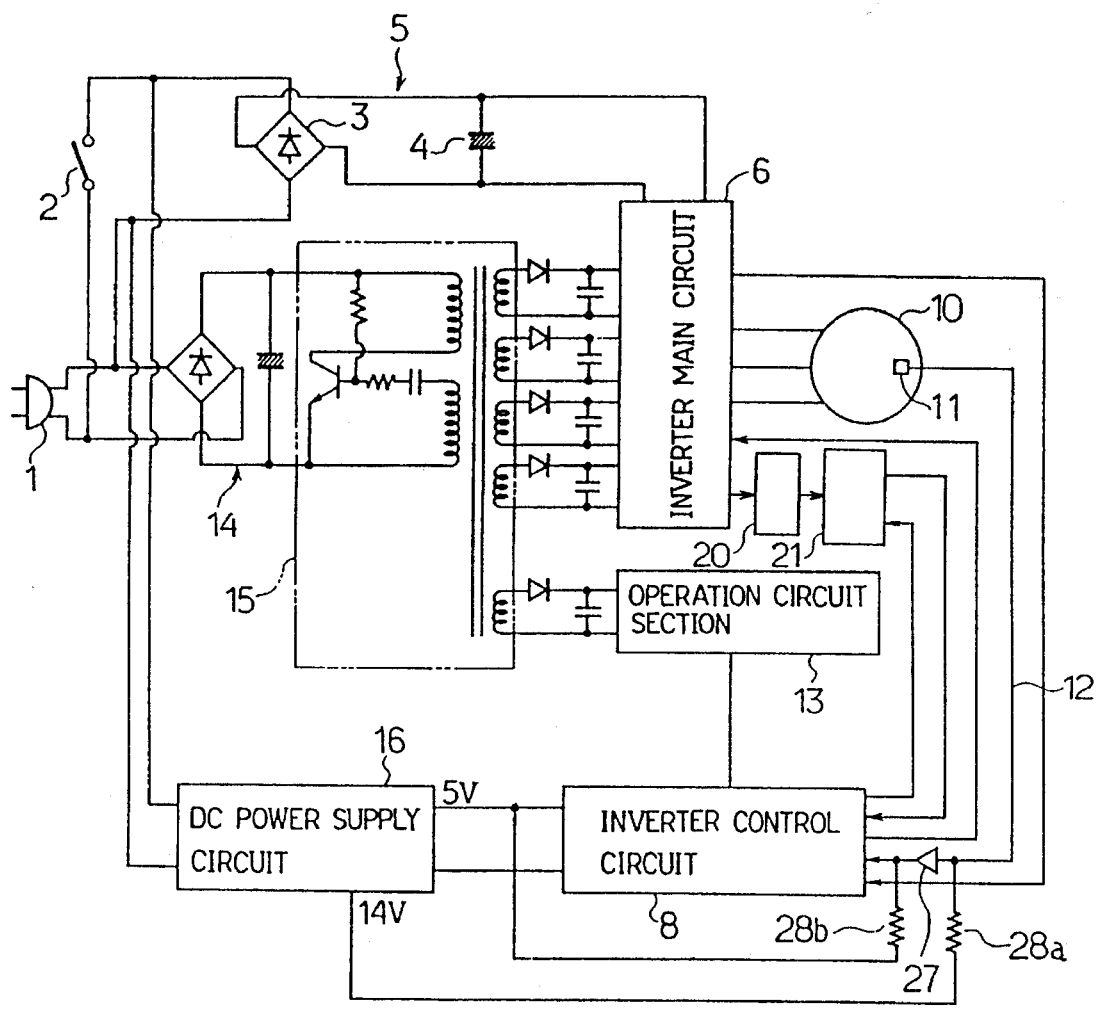
FIG. 2 is a schematic electrical circuit diagram of the washing machine.

One embodiment of the present invention will now be described with reference to FIGS. 1 to 4 of the accompanying drawings. Referring first to FIG. 2, a power supply plug 1 connected to the commercial ac power source is connected via a power supply switch 2 to adc power supply circuit 5 comprising a diode bridge 3 and a smoothing capacitor 4. An inverter main circuit 6 is connected to an output side of the dc power supply circuit 5. The inverter main circuit 6 includes six transistors 7 serving as semiconductor switching elements, as shown in FIG. 1. A motor drive control circuit 9 is composed of the inverter main circuit 6 and an inverter control circuit 8. A three-phase dc brushless motor is employed as a washing machine motor 10 which is connected to the inverter main circuit 6 of the motor drive control circuit 9. The washing machine motor 10 is provided with a Hall IC 11 serving as a position sensing element sensing the rotational position of a rotor of the motor. A signal generated by the Hall IC 11 is supplied to the inverter control circuit 8 through a signal line 12.

An operation circuit section 13 includes a main microcomputer with a clock function for controlling the whole washing operation, input circuits of various switches, a time display and the like. An operating power is supplied to the operation circuit section 13 without operation of the power supply switch 2 and more specifically, the operation circuit section 13 is supplied with the operating power from a dc power supply circuit 14 and a switching transformer 15 connected to the plug 1. On the other hand, the operating power is supplied to the inverter control circuit 8 via the power supply switch 2. More specifically, adc power supply circuit 16 is connected to the plug 1 via the power supply switch 2 and an output of the dc power supply circuit 16 is supplied to the inverter control circuit 8. Thus, the operation circuit section 13 is always supplied with the electrical power from the commercial power source while the electrical power is supplied to the inverter control circuit 8 only when the power supply switch 2 is turned on. This arrangement results in the following advantage: the operation circuit section 13 needs to be always supplied with the electrical power since it has a clock function. Assuming that the inverter control circuit 8 is also arranged to be always supplied with the electrical power, an electrical noise would invade the inverter control circuit 8, causing it to malfunction. However, in the present invention, occurrence of such a malfunction of the inverter control circuit 8 can be prevented since the electrical power is supplied to the inverter control circuit 8 when necessary or when the power supply switch 2 is turned on.

Referring to FIG. 1, the inverter control circuit 8 comprises a base drive circuit 17 and a microcomputer 18. The position sensing signal generated by the Hall IC 11 is supplied to the base drive circuit 17 through the signal line 12. Based on the position sensing signal supplied from the Hall IC 11, the base drive circuit 17 times energization to a winding of the washing machine motor 10. The microcomputer 18 functions as abnormal condition detecting means as will be described later.

A current detecting circuit 19 serving as current detecting means includes a resistance 19a for detecting a current flowing in the inverter main circuit 6 to obtain a corresponding voltage value and a surge absorbing filter 20. An overcurrent determining circuit 21 serving as overcurrent determining means comprises a comparator 23 comparing the detected voltage or current value passing through the filter 20 with a reference voltage value supplied from a reference voltage generating circuit 22 to thereby generate an overcurrent detection signal Sk and a latch circuit 24 latching the overcurrent detection signal Sk. An output of the latch circuit 24 is supplied to the microcomputer 18 and the base drive circuit 17. When supplied with the overcurrent detection signal Sk from the latch circuit 24, the base drive circuit 17 serving as temporary interruption signal generating means delivers a temporary interruption signal to the inverter main circuit 6.

Figure 4:
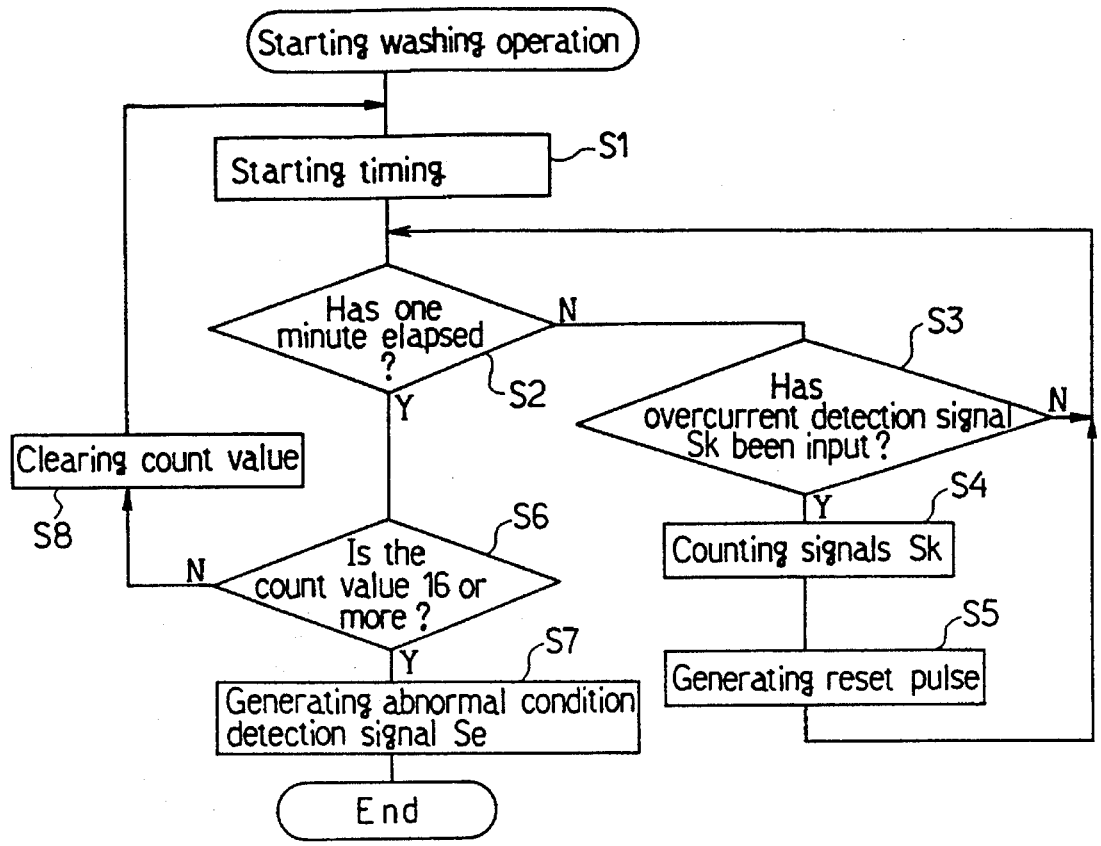
FIG. 4 is a flowchart for explaining the control manner of the microcomputer.

Upon start of the washing operation, the microcomputer 18 performs a control sequence as shown in FIG. 4 in accordance with an internal program. The microcomputer 18 starts timing (step S1) and determines whether or not one minute has elapsed (step S2). When determining that one minute has not elapsed, the microcomputer 18 determines whether or not the overcurrent detection signal Sk has been supplied thereto from the latch circuit 24 (step S3). When determining that the overcurrent detection signal Sk has been supplied, the microcomputer 18 counts the number of times of input of the overcurrent detection signal Sk (step S4) and supplies a reset pulse to the latch circuit 24 to reset it (step S5). The determination at step S3 is periodically performed so that the overcurrent detection signal Sk is checked in a periodical timing. An abnormal condition detection signal Se is generated by the microcomputer 18 (step S7) where the overcurrent detection signal Sk is supplied to the latch circuit 24 even when the reset pulse is supplied to the latch circuit 24 sixteen times or more per minute or where the number of times of output of the overcurrent detection signal Sk from the overcurrent detecting circuit 19 reaches a predetermined value or sixteen or more per minute in the embodiment (step S6). A count value representative of the number of times of input of the overcurrent detection signal Sk is cleared and the operation sequence is returned to step S1 (step S8) when the number of times of output of the overcurrent detection signal Sk does not reach sixteen.

The abnormal condition detection signal Se is supplied to the base drive circuit 17. Upon receipt of the abnormal current detection signal Se, the base drive circuit 17 interrupts its operation and consequently, drive of the inverter drive circuit 6 is interrupted, which then interrupts operation of the washing machine motor 10.

Figure 3:
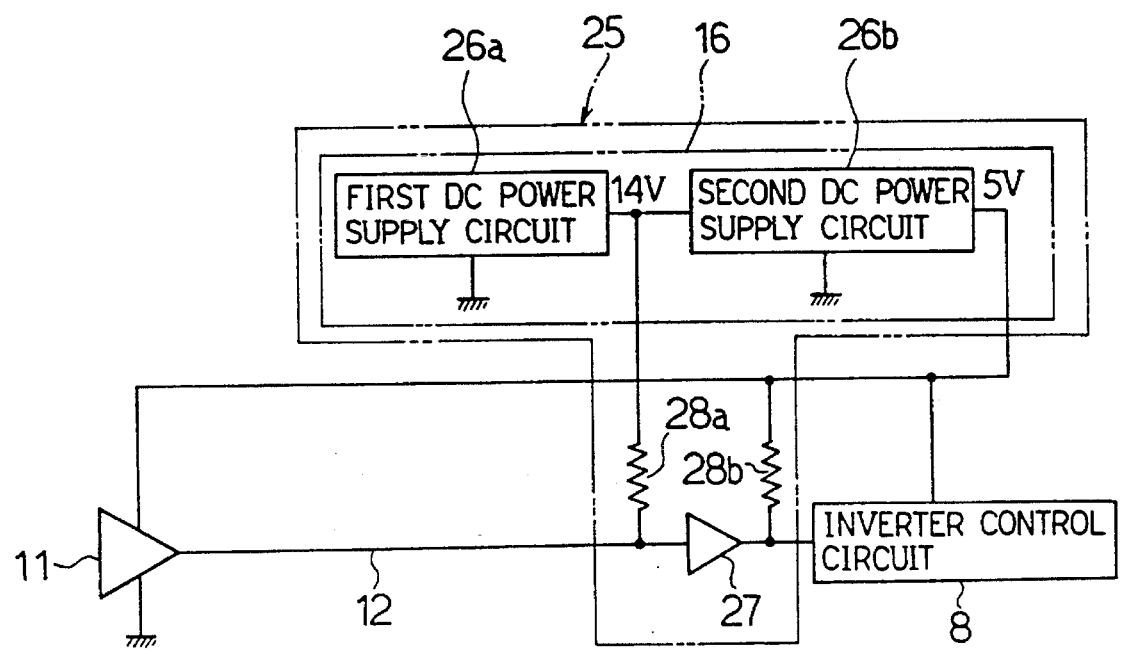
FIG. 3 is an electrical circuit diagram showing a signal line from a Hall IC as the position sensing element to the inverter control circuit.

FIG. 3 illustrates an electrical arrangement of the signal line 12 between the Hall IC 11 and the inverter control circuit 8 and its associated portion. Signal voltage raising means 25 is provided for raising the signal level of the output signal of the Hall IC 11. The signal voltage raising means 25 comprises a first dc power supply circuit 26a delivering adc voltage of 14 V, a second dc power supply circuit 26b delivering a dc voltage of 5 V and a signal level converter 27 comprising an open collector buffer. The first and second dc power supply circuits 26a, 26b compose the above-described dc power supply circuit 16. The signal level converter 27 is connected across the signal line 12 in the vicinity of the input side of the inverter control circuit 8. An output voltage of the first dc power supply circuit 26a is supplied to an input side of the signal level converter 27 on the signal line 12 via a pull-up resistance 28a. An output voltage of the second dc power supply circuit 26b is supplied to an output side of the signal level converter 27 on the signal line 12.

The operating voltage of an electronic circuit such as the inverter control circuit is usually 5 V and accordingly, the voltage of 5 V is represented as the logic level "1" of the output signal of the Hall IC 11. As obvious from the foregoing, the voltage of 14 V is represented as the logic level "1" in the embodiment. The voltage (14 V) of the logic level "1" is converted to the voltage of 5 V by the signal level converter 27.

In accordance with the above-described arrangement, the brushless motor is employed as the washing machine motor 10 in stead of the induction motor and accordingly, the washing machine motor 10 and therefore, the washing machine itself can be rendered small-sized. Furthermore, the current detecting circuit 21 is provided for detecting the current flowing in the inverter main circuit 6 and the overcurrent determining circuit 21 is provided for detecting the overcurrent flowing in the inverter main circuit 6. The microcomputer 18 is provided with a function as the abnormal condition detecting means for generating the abnormal condition detection signal Se when the number of times of output of the overcurrent detection signal Sk reaches the predetermined value within a predetermined period of time. Consequently, the instantaneous overcurrent due to the movement of the clothes in the tub is not determined to be an abnormal condition and only the overcurrent due to the heavy load causing the inverter main circuit 6 to malfunction is determined to be an abnormal condition. In particular, since the operation of the base drive circuit 17 is interrupted based on the abnormal condition detection signal Se, deterioration of the transistors 7 of the inverter main circuit 6 can be prevented and burnout of the washing machine motor can also be prevented. Additionally, the temporary interruption signal is delivered from the base drive circuit 17 upon generation of the overcurrent detection signal Sk. Consequently, the inverter main circuit 6 is turned off for a predetermined short period of time such that the transistors 7 can be protected.

Since the voltage level of the output signal of the Hall IC 11 serving as the position sensing element can be raised, the S/N ratio can be increased. Consequently, the signal transmission from the Hall IC 11 to the inverter control circuit 8 can be reliably performed without any influence of noise even when the noise invades the signal line 12.

Figure 5:
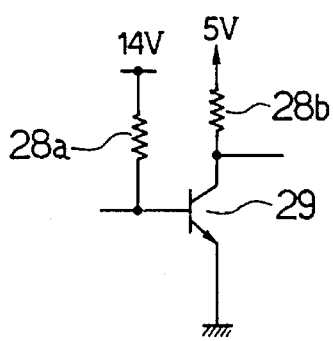
FIG. 5 is an electrical circuit diagram showing a voltage conversion arrangement in another embodiment of the invention.

The signal level converter 27 comprising the open collector buffer is provided for converting the voltage levels of the output signal of the Hall IC 11 from 14 V to 5 V in the foregoing embodiment. Another signal level converter composed of a transistor 29 may be employed as shown as another embodiment of the invention in FIG. 5, instead of the converter 27. More specifically, the collector of the transistor 29 is connected to the input side of the inverter control circuit 8 and to the second dc power supply circuit 26b via the pull-up resistance 28b. The base of the transistor 29 is connected to the output side of the Hall IC 11 and to the first dc power supply circuit 26a via the pull-up resistance 28a.

The foregoing disclosure and drawings are merely illustrative of the principles of the present invention and are not to be interpreted in a limiting sense. The only limitation is to be determined from the scope of the appended claims.

We claim:

1. A device for protecting a washing machine motor including a brushless motor against an overcurrent, the device comprising:

a) a position sensing element for sensing a rotational position of a rotor of the washing machine motor;

b) a motor drive control circuit comprising an inverter main circuit including a plurality of semiconductor switching elements for driving the washing machine motor and an inverter control circuit for controlling the semiconductor switching elements of the inverter main circuit based on a signal generated by the position sensing element;

c) overcurrent detecting means comprising current detecting means for detecting a current flowing in the inverter main circuit, a reference voltage generating circuit, a comparing circuit comparing a voltage detected by the current detecting means with the reference voltage generated by the reference voltage generating circuit and generating an overcurrent detection signal when the voltage detected by the current detecting means exceeds the reference voltage generated by the reference voltage generating circuit, and a latch circuit latching the overcurrent detection signal generated by the comparing circuit;

d) abnormal condition detecting means counting up or down and subsequently resetting the latch circuit every time the same is supplied with one overcurrent detection signal from the latch circuit, the abnormal condition detecting means generating an abnormal condition detection signal when having counted up or down by a preselected number of times or more per predetermined period;

e) means for holding the semiconductor switching elements of the inverter main circuit in an off state when supplied with an abnormal condition detection signal, so that a washing operation by means of the washing machine motor is interrupted; and f) temporary interruption signal generating means for generating a temporary interruption signal for temporarily turning off the semiconductor switching elements of the inverter main circuit for a predetermined short period of time every time when supplied with the overcurrent detection signal from the latch circuit before the abnormal condition detecting means counts up or down by the preselected number of times.

2. A device for detecting rotational position of a washing machine motor including a brushless motor comprising:

a) a position sensing element for sensing a rotational position of a rotor of the washing machine motor;

b) a motor drive control circuit for driving the washing machine motor and an inverter control circuit for controlling an inverter main circuit based on a signal generated by the position sensing element and the like; and c) signal voltage raising means comprising a signal level converter arranged closer to the inverter control circuit than to the position sensing element and across a signal line through which the signal generated by the position sensing element is delivered to the inverter control circuit, a first direct current power supply supplying a first direct current voltage to a signal line at an input side of the signal level converter so that a voltage level of the signal on the signal line at the input side of the signal level converter is raised, and a second direct current power supply supplying a second direct current voltage lower than the first direct current voltage to the signal line at an output side of the signal level converter so that a voltage level of a signal delivered through the signal line at the output side of the signal level converter is rendered lower than the signal level of the signal on the signal line at the input side of the signal level converter.

\* \* \* \* \*